United States Patent
Tiryakian et al.

(10) Patent No.: US 12,443,993 B2
(45) Date of Patent: Oct. 14, 2025

(54) VIRTUAL CARD GAME LINKED TO PLAYER PERFORMANCE IN AN EVENT AND METHODS AND SYSTEMS FOR PROVIDING THE SAME

(71) Applicant: Fandex, Inc., Durham, NC (US)

(72) Inventors: Edward Tiryakian, Durham, NC (US); Matthew D'Alessandro, Durham, NC (US); Nicholas Canova, Durham, NC (US); Kyle Carrozza, Durham, NC (US)

(73) Assignee: FANDEX, INC., Durham, NC (US)

( * ) Notice: Subject to any disclaimer, the term of this patent is extended or adjusted under 35 U.S.C. 154(b) by 369 days.

(21) Appl. No.: 18/126,237

(22) Filed: Mar. 24, 2023

(65) Prior Publication Data

US 2023/0306510 A1    Sep. 28, 2023

Related U.S. Application Data

(63) Continuation-in-part of application No. 17/901,658, filed on Sep. 1, 2022, now Pat. No. 12,033,213, which
(Continued)

(51) Int. Cl.
  G06Q 40/04   (2012.01)
  G06F 9/54    (2006.01)
  G06F 30/20   (2020.01)

(52) U.S. Cl.
  CPC ............ *G06Q 40/04* (2013.01); *G06F 9/541* (2013.01); *G06F 30/20* (2020.01)

(58) Field of Classification Search
  CPC .......... G06Q 40/04; G06F 9/541; G06F 30/20
(Continued)

(56) References Cited

U.S. PATENT DOCUMENTS 5,971,854 A    10/1999   Pearson .................. A63F 3/081
                                              463/41
8,538,563 B1    9/2013   Barber ................ G07F 17/3276
                                              463/28
(Continued)

FOREIGN PATENT DOCUMENTS

EP    2368611 A2 *   9/2011   ........... A63F 13/798

OTHER PUBLICATIONS

Kuznietsova, et al., "Forecasting of Financial Risk Users' Outflow", Institute for Applied System Analysis of the National University of Ukraine, Igor Sikorsky Kyiv Polytechnic Institute, Kyiv, Ukraine, .. (Year: 2018).*
(Continued)

*Primary Examiner* — Frantzy Poinvil
(74) *Attorney, Agent, or Firm* — Dentons US LLP; Derek A Auito

(57) ABSTRACT

A virtual card game including a game server coupled to an events database with event data and a players database with player data; a plurality of game clients associated with game participants each coupled to the game server; wherein each game client transmits a pay-in amount to the game server; and the game server randomly deals a hand from a virtual card shoe having a plurality of virtual cards each corresponding to one or more players; receives player performance data corresponding to each of the players; calculates a card value for each virtual card based on the player performance data; calculates a virtual hand value for each game participant based on the card values; determines at least one winner based on the virtual hand value associated with each game participant; calculates a payout for each winner; and transmits the payout to the game client associated with each winner.

20 Claims, 16 Drawing Sheets

Related U.S. Application Data is a continuation of application No. 16/376,618, filed on Apr. 5, 2019, now Pat. No. 11,436,674.

(60) Provisional application No. 62/652,960, filed on Apr. 5, 2018.

(58) Field of Classification Search
USPC .................................................. 705/3–44
See application file for complete search history.

(56) References Cited

U.S. PATENT DOCUMENTS

| | | | |
|---|---|---|---|
| 9,120,006 B2* | 9/2015 | Palmer | A63F 1/04 |
| 10,147,266 B2 | 12/2018 | Joao | G07F 17/3288 |
| 11,351,465 B1 | 6/2022 | Litman | A63F 13/828 |
| 2007/0060380 A1 | 3/2007 | McMonigle | G07F 17/32 463/42 |
| 2008/0207333 A1 | 8/2008 | Johnson | A63F 13/798 463/42 |
| 2015/0224406 A1 | 8/2015 | Wolgin | A63F 13/792 463/9 |
| 2017/0249806 A1* | 8/2017 | Lutnick | G07F 17/3293 |
| 2017/0252656 A1* | 9/2017 | Uy | A63F 13/35 |
| 2018/0001204 A1* | 1/2018 | Eisenstein | A63F 13/828 |
| 2019/0221072 A1 | 7/2019 | Litman | A63F 3/0665 |
| 2019/0362600 A1 | 11/2019 | Odom | G07F 17/3237 |
| 2020/0009463 A1* | 1/2020 | Brancato | A63F 13/828 |
| 2020/0023278 A1* | 1/2020 | Perkin | A63F 13/58 |
| 2020/0188799 A1 | 6/2020 | Croci | A63F 13/828 |

OTHER PUBLICATIONS

Satyapanich et al., Predicting Game Results for football League Using Deep Learning, Computer Engineering Department, Faculty of Engineering at Sriracha, Kasetsart University, Chonburi, 20230, Thailand . (Year: 2023).*

Akhigbe et al., "Predictable sports sentiment and local trading", Financial Management 46.2: 433(21), Financial Management Association, Jul.-Sep. 2017.

* cited by examiner

| | SYMBOL | PRICE | +/- | +/- | BAL TOTAL | RECORD |
|---|---|---|---|---|---|---|
| CAROLINA PANTHERS | PNTH | 12.00 | -1.30 | -3.15 | 6 | NIL |
| ARIZONA CARDINALS | card | 9.50 | 0.77 | 0.82 | 8.5 | 5-2 |
| ATLANTA FALCONS | FALC | 10.50 | 8.40 | 4.3 | 8.5 | 10-6 |
| BALTIMORE RAVENS | RAVE | 11.00 | -2.80 | -5.75 | 6 | 5-7 |
| CHICAGO BEARS | BEAR | 8.50 | -2.14 | -1.46 | 5.5 | 6-11 |
| CINCINNATI BENGALS | BNGL | 9.50 | 0.77 | 0.36 | 8.5 | 7-3 |
| DALLAS COWBOYS | CBOY | 12.00 | 10.75 | 6.80 | 5 | 9-7 |
| DENVER BRONCOS | BRON | 7.00 | -10.30 | -4.30 | 6 | 5-11 |
| DETROIT LIONS | GU 702 | 10.50 | 0.32 | 2.05 | 7.5 | 9-7 |
| GREEN BAY PACKERS | | 8.50 | -1.29 | 4.27 | 10.5 | 7-8 |
| HOUSTON TEXANS | TEXN | 5.50 | -2.40 | -3.38 | 6.5 | 4-12 |
| INDIANAPOLIS COLTS | COLT | 6.00 | 5.50 | 3.66 | 6 | 4-12 |

FIG. 7

VIRTUAL CARD GAME LINKED TO PLAYER PERFORMANCE IN AN EVENT AND METHODS AND SYSTEMS FOR PROVIDING THE SAME

PRIORITY CLAIM

This patent application is a continuation-in-part of U.S. patent application Ser. No. 17/901,658 filed on Sep. 1, 2022, which is a continuation of U.S. patent application Ser. No. 16/376,618 filed on Apr. 5, 2019, now U.S. Pat. No. 11,436,674, which claims priority to U.S. Provisional Application No. 62/652,960 filed on Apr. 5, 2018, the disclosures of which are incorporated herein by reference in their entirety.

TECHNICAL FIELD

The present invention relates to market trading simulation via a middleware architecture including front-end and back-end components. More specifically methods, systems, and devices are disclosed for providing an enhanced sports league simulated stock exchange including volatility and competition via a service-oriented architecture (SOA) and a virtual card game linked to player performance in an event.

BACKGROUND

Fantasy sports games and other sports simulations involve statistics for real athletes used with virtual teams. Participants select their virtual teams from the real athletes and use the real-world statistics of the real athletes. The virtual teams are then used in simulated competitions for prizes and/or monetary gain among the participants. A recent development also includes sports stock exchanges allowing participants (i.e., investors) to buy and sell shares in a simulated sports stock market associated with real teams in a sports league.

A limitation of fantasy sports leagues is that they require a significant time commitment from the participants. Participants spend considerable time creating their fantasy teams using systems such as virtual drafts. They then invest additional time in selecting players from their virtual team to play in each event. These substantial time commitments deter many sports fans from participating in fantasy leagues. Another limitation of fantasy leagues is that participants' opportunities to win are often determined early in a season, based on the team they assemble and based on early season results; this causes many participants to lose interest over time.

Accordingly, a need exists for a different type of game linked to sporting events that is easier to participate in and that includes random selections to give all participants an equal opportunity to win. While this type of game may include varying elements of skill, certain game types preferably involve a relatively small number of simple decisions in comparison to the complexity and time investment of fantasy sports leagues.

SUMMARY

Disclosed is a virtual card game linked to player performance in an event and methods and systems for providing the same.

In accordance with an embodiment of the invention, the virtual card game linked to player performance includes a game server coupled to an events database having events data including one or more sporting events scheduled during a game time period; a players database having player data including a plurality of players scheduled to participate in the one or more sporting events; a plurality of game clients each coupled to the game server via a network connection, wherein each game client is associated with a game participant of a plurality of game participants; and the game server is configured to randomly deal a virtual hand from a virtual card shoe to each game participant, the virtual card shoe having a plurality of virtual cards, wherein each of the plurality of virtual cards corresponds to one or more players selected from the plurality of players; transmit the virtual hand of each game participant to the corresponding game client; receive player performance data corresponding to each of the plurality of players that is a measure of each player's performance in the one or more sporting events; calculate a card value for each virtual card based on the player performance data corresponding to the one or more players associated with each virtual card; calculate a virtual hand value for each game participant based on the card value for the plurality of virtual cards in the virtual hand dealt to each game participant; determine one or more winners from the plurality of game participants based on the virtual hand value associated with each game participant; calculate a payout from a pot for each winner of the one or more winners; and transmit the payout associated with each winner to the game client associated with each winner.

Each game client of the virtual card game may include one or more of a web browser and an app.

Each virtual card may be one of a player card corresponding to a single player selected from the multiplicity of players, or a team card corresponding to all players of the multiplicity of players that are on a single team.

The player performance data may include a plurality of player statistics, and the card value for each virtual card may be a function of the plurality of player statistics associated with the one or more players corresponding to each virtual card.

The function of the plurality of player statistics may be a weighted sum of the plurality of player statistics.

The plurality of player statistics associated with a player may include one or more positive statistics that represent a positive contribution of the player to the outcome of an event the player participates in; and one or more negative statistics that represent a negative contribution of the player to the outcome of an event the player participates in; and the weights in the weighted sum are positive for the one or more positive statistics and negative or the one or more negative statistics.

Each game client may be configured to accept one or more discarded virtual cards from the hand of the associated game participant and to transmit the one or more discarded virtual cards to the virtual card shoe.

The game server may be configured to deal a replacement virtual card from the virtual card shoe to the hand of each game participant for each discarded virtual card, wherein the replacement virtual card may correspond to one or more players selected from the plurality of players.

At one or more times prior to the end of the game time period, the game server may be configured to receive within-event updates to the player performance data while the one or more sporting events are occurring; calculate an interim card value for each virtual card based on the within-event updates to the player performance data; calculate an interim virtual hand value for each game participant based on the sum of the interim card value for the plurality of virtual cards in the virtual hand dealt to each game participant; and transmit the interim virtual hand value for each game participant to the corresponding game client; and the game client associated with each game participant may be configured to display the interim virtual hand value.

The game server may be configured to calculate an interim ranking for each game participant based on a distribution of interim virtual hand values and to transmit the interim ranking to the corresponding game client; and the game client associated with each game participant may be configured to display the interim ranking.

The game server may deal the virtual hand with a plurality of virtual cards to each game participant and be configured to calculate an expected card value for each virtual card from historical player performance data; calculate an expected virtual hand value for each game participant based on the sum of the expected virtual card value for the plurality of virtual cards in the virtual hand dealt to each game participant; and transmit the expected virtual hand value for each game participant to the corresponding game client; and, the game client associated with each game participant may be configured to display the expected virtual hand value.

The game server may be configured to calculate an expected ranking for each game participant based on a distribution of the expected virtual hand values and to transmit the expected ranking to the corresponding game client; and the game client associated with each game participant may be configured to display the expected ranking.

The game server may be coupled to one or more collectible sets, wherein each of the collectible sets includes one or more virtual card.

The game server may be configured to add the plurality of virtual cards in the hand of each game participant to a virtual card collection associated with each game participant; and when a virtual card collection associated with a game participant contains all or a predetermined number of the virtual cards in a collectible set of the one or more collectible sets, transmit to the game participant a reward corresponding to the collectible set.

At least one of the one or more collective sets may include at least one of (i) all of the virtual cards associated with all of the players on a team, and (ii) all of the virtual cards associated with all of the players in a league.

At least one of the one or more collective sets may include at least one of (i) a predetermined number of all of the virtual cards associated with all of the players on a team, and (ii) a predetermined number of all of the virtual cards associated with all of the players in a league.

The features and advantages described in this summary and the following detailed description are not all-inclusive. Many additional features and advantages will be apparent to one of ordinary skill in the art in view of the drawings, specification, and claims presented herein.

BRIEF DESCRIPTION OF THE DRAWINGS

The accompanying drawings constitute a part of this specification and illustrate an embodiment of the invention and together with the specification, explain the invention.

FIG. 7 depicts a mobile device illustrating a graphical user interface (GUI) in accordance with embodiments of the present disclosure.

DETAILED DESCRIPTION

Figure 1:
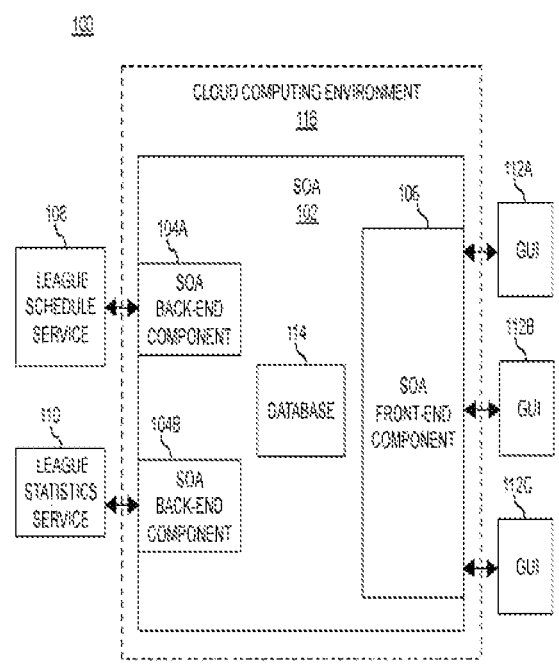
FIG. 1 depicts a block diagram illustrating a service-oriented architecture (SOA) for providing an enhanced sports league simulated stock exchange in accordance with embodiments of the present disclosure.

The subject matter disclosed herein relates to middleware including front-end and back-end components. More specifically, devices, systems, and methods are disclosed for providing a middleware solution that provides a solution for the problem of providing an enhanced sports league simulated stock exchange including volatility and competition.

The following description and figures are illustrative and are not to be construed as limiting. Numerous specific details are described to provide a thorough understanding of the disclosure. However, in certain instances, well-known or conventional details are not described in order to avoid obscuring the description. References to "one embodiment" or "an embodiment" in the present disclosure can be, but not necessarily are, references to the same embodiment and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not for other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification, including examples of any terms discussed herein, is illustrative only, and is not intended to further limit the scope and meaning of the disclosure or of any exemplified term. Likewise, the disclosure is not limited to various embodiments given in this specification.

Without intent to limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions, will control.

FIG. 1 depicts a block diagram 100 illustrating a service-oriented architecture (SOA) 102 for providing an enhanced sports league simulated stock exchange representing a plurality of real teams associated with a real sports league in accordance with embodiments of the present disclosure. For example, the real sports league may be the National Football League (NFL®), the National Basketball League (NBA®), the National Hockey League (NHL®), the Major League Baseball (MLB®) league, the Major League Soccer (MLS®) league, or the like.

The SOA 102 is configured to provide a collection of services, wherein the services communicate with each other. The communications may range from simple exchanges of data to two or more services for coordinating one or more activities. Each service may be a function that is self-contained and well-defined. Each service may not depend on a state or context of each of the other services.

The SOA 102 includes at least SOA back-end components 104A and 104 b, and an SOA front-end component 106. The SOA back-end component 104A is configured to communicate with a league schedule service 108. The SOA back-end component 104A may receive a first dataset including at least a portion of a preseason schedule, a regular season schedule, and/or a post season schedule from the league schedule service 108. The SOA back-end component 104B is configured to communicate with a league statistics service 110. The SOA back-end component 104 B may receive a second dataset including real statistics for games played and/or players' performances associated with the real sports league. In some embodiments the league schedule service 108 and the league statistics service 110 may be a single service and the single service may communicate with only one SOA back-end component. The SOA 102 is further configured to determine at least a first per-share value of a plurality of simulated shares associated with at least one real team.

The SOA front-end component 106 is configured to communicate with a plurality of graphical user interfaces (GUIs) 112A-112C. Each GUI 112 may be provided by a user device (not shown in FIG. 1) such as a personal computer (PC), a laptop, a tablet, a smart television (TV), or the like. In some embodiments, the GUI may be at least partially provided by a holographic projector. The GUI may be further provided by a web browser configured for the user device. The web browser may be a Microsoft Internet Explorer® browser, a Microsoft Edge® browser, an Apple Safari® browser, a Google Chrome® browser, a Mozilla Firefox® browser, an Opera® browser, or the like. In other embodiments, the GUI may be further provided by a dedicated application developed specifically for the enhanced sports league simulated stock exchange. The SOA 102 is further configured to transmit the first per-share value to at least one of the GUIs 112A-112C.

The SOA 102 also includes a database 114. For example, the database may be an open-source database such as the MongoDB® database, the PostgreSQL® database, or the like. The SOA 102 is implemented within a cloud computing environment 118. The cloud computing environment 116 is a networked computing environment including one or more servers. In some embodiments, the one or more servers may include one or more virtualized servers. The SOA 102 may also be implemented within a virtual container, for example the Docker® virtual container.

The SOA back-end components 104A-B and the SOA front-end component may also include one or more network interfaces. The one or more network interfaces may be one or more wide area network (WAN) interfaces, local area network (LAN) interfaces, wired interfaces, wireless interfaces, and/or optical interfaces. Additionally, the one or more network interfaces may use one or more transfer protocols such as a hypertext transfer protocol (HTTP) session, an HTTP secure (HTTPS) session, a secure sockets layer (SSL) protocol session, a transport layer security (TLS) protocol session, a datagram transport layer security (DTLS) protocol session, a file transfer protocol (FTP) session, a user datagram protocol (UDP), a transport control protocol (TCP), or a remote direct memory access (RDMA) transfer protocol. In some embodiments, one or more of the network interfaces may be configured to communicate over the Internet.

An additional front-end component (not shown in FIG. 1) may be configured to provide an administrator access secure web portal. The administrator access secure web portal may be configured to provide status and control of the SOA 102. For example, the administrator access secure web portal may allow for configuration of parameters of the enhanced sports league simulated stock exchange.

The SOA 102 may include a non-transitory computer readable medium including a plurality of machine-readable instructions, which when executed by one or more processors of the one or more servers, are adapted to cause the one or more servers to perform the steps of (1) receiving the first and second datasets, (2) determining the first per-share value, and (3) transmitting the first per-share value. In a preferred embodiment, the SOA 102 is implemented on a virtual (i.e., software implemented) server in the cloud computing environment 116. An Ubuntu® server (not shown in FIG. 1.) may provide the virtual server and may be implemented as a separated operating system (OS) running on one or more physical (i.e., hardware implemented) servers. Any applicable virtual server may be used for the Ubuntu® Server function. The Ubuntu® Server function may be implemented in the Microsoft Azure®, the Amazon Web Services® (AWS), or the like cloud computing data center environments. In other embodiments, the SOA 102 may be implemented on one or more servers in a networked computing environment located within a business premise or another data center.

The SOA 102 transforms the virtual server, the virtual container, and/or or the one or more servers into a machine that provides a solution for solving the problem of providing an enhanced sports league simulated stock exchange including volatility and competition among users (i.e., investors). Specifically, the SOA front-end components are operable to be combined with the SOA back-end components to form an operable SOA solution.

Figure 2:
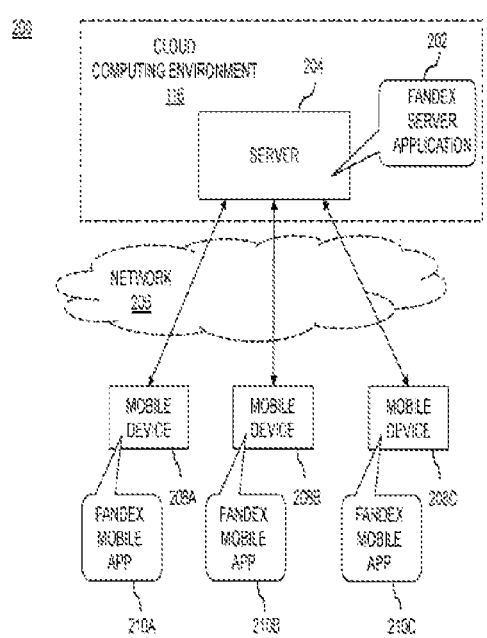
FIG. 2 depicts a block diagram illustrating a client/server architecture of an enhanced sports league simulated stock exchange in accordance with embodiments of the present disclosure.

FIG. 2 depicts a block diagram 200 illustrating a client/server architecture of the enhanced sports league simulated stock exchange in accordance with embodiments of the present disclosure. The cloud computing environment 116 of FIG. 1 is shown providing the Fandex server application 202 hosted with server 204. The Fandex server application 202 is provided on a non-transitory computer readable medium including a plurality of machine-readable instructions, which when executed by one or more processors of the server 204, are adapted to cause the server 204 to perform the steps of (1) receiving the first and second datasets, (2) determining the first per-share value, and (3) transmitting the first per-share value. Additional steps may further include (4) storing the first per-share value as at least a portion of a record in the database 114; (5) receiving a third dataset including updated real statistics associated with the real sports league, (6) determining, using the third dataset, a second per-share value of a plurality of simulated shares associated with the first real team of the plurality of real teams; and (7) transmitting the second per-share value. In general terms, the Fandex server application 202 provides the SOA 102 of FIG. 1.

The Fandex server application 202 is configured to communicate over a network 206. In a preferred embodiment, the network 206 is the Internet. In other embodiments, the network 206 may be restricted to a private LAN and/or WAN. The network 206 provides connectivity with mobile devices 208A-208C. Fandex mobile apps 210A-210C are hosted on mobile devices 208A-208C and provide the GUIs 112A-112C of FIG. 1. In a preferred embodiment, the Fandex server application 202 provides an application programming interface (API) for each Fandex mobile app 210.

Figure 3:
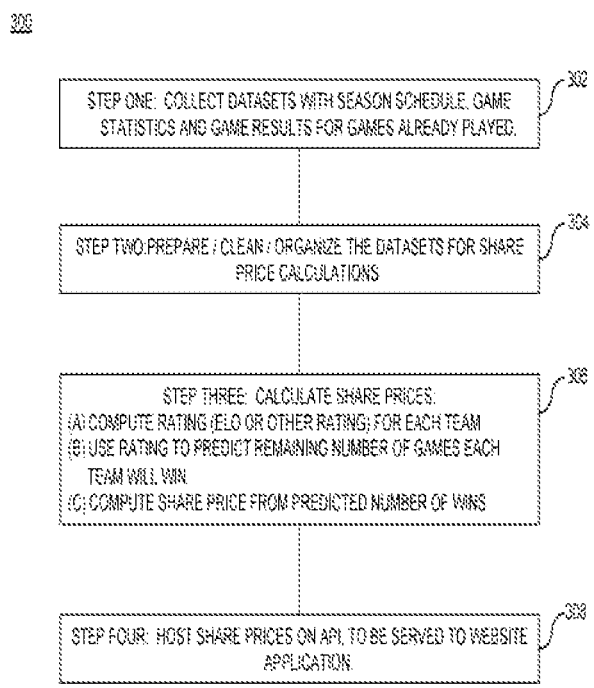
FIG. 3 depicts a flowchart illustrating a process for providing an enhanced sports league simulated stock exchange in accordance with embodiments of the present disclosure.

FIG. 3 depicts a flowchart illustrating a process for providing an enhanced sports league simulated stock exchange in accordance with embodiments of the present disclosure.

In step one 302, the SOA 102 collects (e.g., receives) datasets associated with team schedules, per game statistics, and game results for games already played. The datasets may be associated with preseason, regular season, or post season play of the real sports league. In certain embodiments, the datasets may be collected daily during a time when no games are being played. For example, the datasets may be collected each day at 3:00 AM EST.

In step two 304, the SOA 102 organizes and preprocesses the datasets of step one 302 for per-share price calculations. The preprocessed datasets may be stored in the database 114 of FIG. 1.

In step three 306, the SOA 102 calculates share prices. First an ELO rating or other type of rating is computed. Next, this rating is used to predict the remaining number of games each team will win and/or the total number of points each team is expected to score. Additionally, previous predictions may be used in this determination. Then a per-share price for each team is computed from the prediction. The per-share price for each team may also be stored in the database 114. In some embodiments the database 114 may be one or more "comma separated values" CSV files. The daily datasets are checked and compared against previous datasets for discrepancies. If a discrepancy is determined a previous dataset or portion of a previous dataset may be used.

In step four 308, the per-share price for each team is hosted on an API available to each Fandex mobile app 210 over the network 212 of FIG. 2. Once all shares of all teams are sold to users, the pre-share prices may transition to values determined by buy/sell demands of users.

Figure 4:
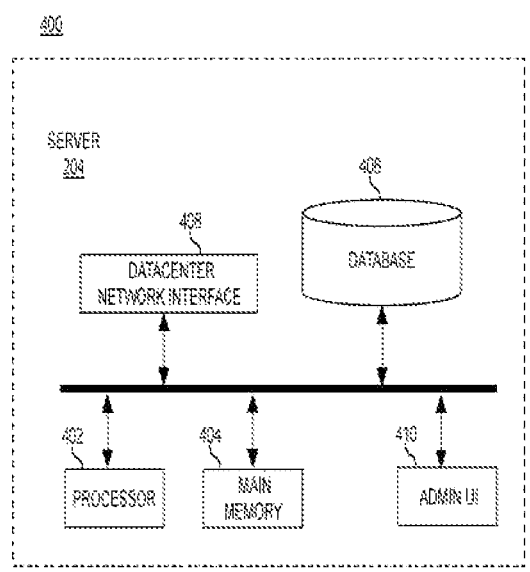
FIG. 4 depicts a block diagram of a server in accordance with embodiments of the present disclosure.

FIG. 4 depicts a block diagram 400 of the server 204 of FIG. 2 for hosting at least a portion of the SOA 102 of FIG. 1 and/or Fandex server application 202 of FIG. 2 in accordance with embodiments of the present disclosure. The server 204 is a hardware server and may include at least one of a processor 402, a main memory 404, a database 406, a datacenter network interface 408, and an administration user interface (UI) 410. The server 200 may be configured to host one or more virtualized servers. For example, the virtual server may be an Ubuntu® server or the like and as discussed in FIG. 2. The server 204 may also be configured to host a virtual container. For example, the virtual server may be the Docker® virtual server or the like. In some embodiments, the virtual server and or virtual container may be distributed over a plurality of hardware servers using hypervisor technology.

The processor 402 may be a multi-core server class processor suitable for hardware virtualization. The processor 402 may support at least a 64-bit architecture and a single instruction multiple data (SIMD) instruction set. The memory 404 may include a combination of volatile memory (e.g., random access memory) and non-volatile memory (e.g., flash memory). The database 406 may include one or more hard drives. The database 406 may provide at least a portion of the functionality of the database 114 described with FIG. 1.

The datacenter network interface 408 may provide one or more high-speed communication ports to the data center switches, routers, and/or network storage appliances. The datacenter network interface may include high-speed optical Ethernet, InfiniB and (TB), Internet Small Computer System Interface iSCSI, and/or Fibre Channel interfaces. The administration UI may support local and/or remote configuration of the server by a data center administrator.

Figure 5:
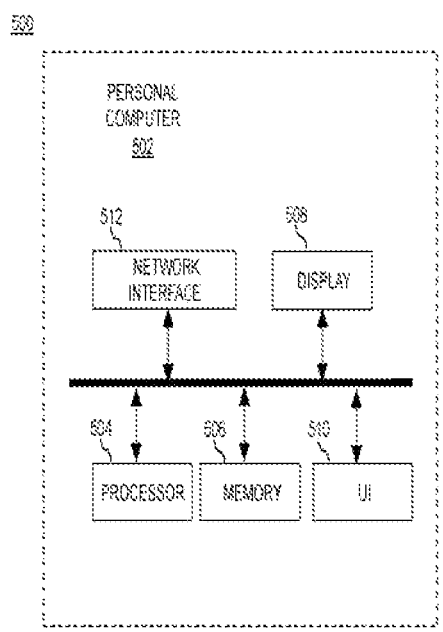
FIG. 5 depicts a block diagram of a personal computer in accordance with embodiments of the present disclosure.

FIG. 5 depicts a block diagram 500 of a personal computer 502 in accordance with embodiments of the present disclosure. The personal computer 502 is configured to provide at least one of the GUIs 112A-112C of FIG. 1. The personal computer 502 may include at least a processor 504, a memory 506, a display 508, a user interface (UI) 510, and a network interface 512. The personal computer 800 may include an operating system to run the web browser or dedicated application as discussed in FIG. 1. The operating system (OS) may be a Windows® OS, a Macintosh® OS, a Linux® OS, or the like. The memory 506 may include a combination of volatile memory (e.g., random access memory) and non-volatile memory (e.g., solid state drive and/or hard drives).

The network interface 512 may be a wired Ethernet interface or a Wi-Fi interface. The personal computer 502 may be configured to access remote memory (e.g., network storage and/or cloud storage) via the network interface 512. The UI 510 may include a keyboard, and a pointing device (e.g., mouse). The display 508 may be an external display (e.g., computer monitor) or internal display (e.g., laptop). In some embodiments, the personal computer may be a smart TV. In other embodiments, the display 508 may include a holographic projector.

Figure 6:
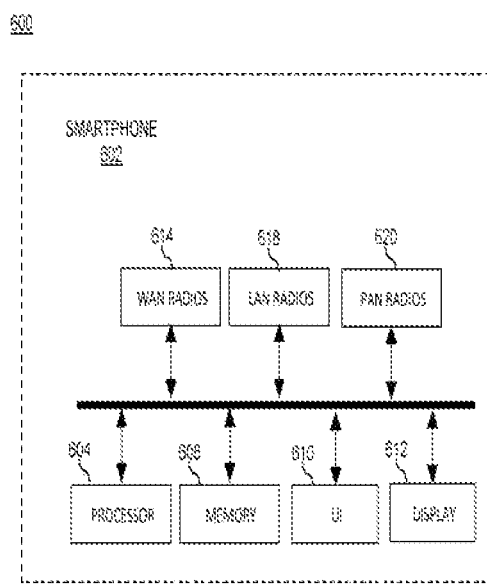
FIG. 6 depicts a block diagram of a smartphone in accordance with embodiments of the present disclosure.

FIG. 6 depicts a block diagram 600 of a smartphone 602 in accordance with embodiments of the present disclosure. The smartphone 602 is configured to provide at least one of the GUIs 112A-112C of FIG. 1 and may be representative of at least one of the mobile devices 208A-208C of FIG. 2. The smartphone 602 may also host the Fandex mobile app 210 of FIG. 2. The smartphone 602 may include at least a processor 604, a memory 608, a UI 610, a display 612, WAN radios 614, LAN radios 618, and personal area network (PAN) radios 620. In some embodiments the smartphone 602 may be an iPhone® or an iPad®, using iOS® as an OS. In other embodiments the smartphone 602 may be a mobile terminal including Android® OS, BlackBerry® OS, Chrome® OS, Windows Phone® OS, or the like.

In some embodiments, the processor 604 may be a mobile processor such as the Qualcomm® Snapdragon™ mobile processor. The memory 608 may include a combination of volatile memory (e.g., random access memory) and non-volatile memory (e.g., flash memory). The memory 608 may be partially integrated with the processor 604. The UI 610 and display 612 may be integrated such as a touchpad display. The WAN radios 614 may include 2G, 3G, 4G, and/or 5G technologies. The LAN radios 618 may include Wi-Fi technologies such as 802.11a, 802.11b/g/n, and/or 802.11ac circuitry. The PAN radios 620 may include Bluetooth® technologies.

FIG. 7 depicts a mobile device 700 illustrating a GUI 702 in accordance with embodiments of the present disclosure. The mobile device 700 may be the smartphone 602 of FIG. 6. In this illustration the GUI 702 depicts a screenshot of the Fandex mobile app 210. Per-share prices for a plurality of teams for a plurality of leagues are displayed.

Figure 8:
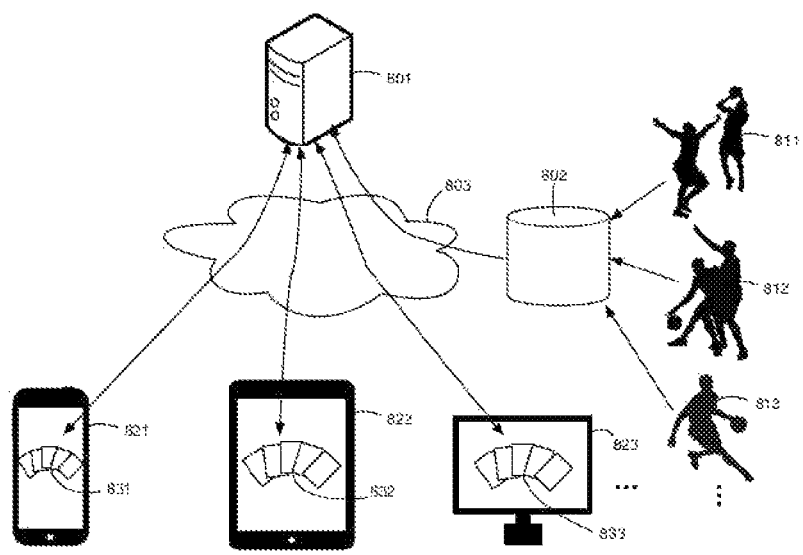
FIG. 8 depicts a client-server architecture for a virtual card game enabled by one or more embodiments of the present disclosure.

One or more embodiments of the present disclosure may enable a virtual card game in which participants are dealt virtual cards that correspond to players in sporting events. The virtual cards in each hand may be valued based on the performance of the corresponding players. FIG. 8 shows an illustrative client-server architecture that may enable such virtual card games. Each participant in the virtual card game may have a client device 821, 822, 823, which may be for example, without limitation, a mobile phone, a tablet, a laptop, a notebook computer, a desktop computer, smart glasses, or a virtual reality headset. A client application may execute on each associated client device; the client application may be for example a browser, an app on a mobile device, or an application on any type of computer. Clients may communicate with a server 801 over a network 803, which may be any wired or wireless network or networks such as the Internet or the World Wide Web, or a private network. The server 801 may be any processor or collection of processors. The server manages the virtual card game; it deals virtual hands to each participant and transmits these hands to the clients associated with each participant. In the example shown in FIG. 8, the server has dealt virtual hand 831 to client device 821 (e.g., a mobile phone), virtual hand 832 to client device 822 (e.g., a tablet), and virtual hand 833 to client device 823 (e.g., a desktop computer). The game may have any number of participants; only three participants are shown on FIG. 8 for ease of exposition. Virtual card hands may consist of any number of virtual cards, where the number of cards per hand may depend on the specific variation of the virtual card game that is being played. In the example shown in FIG. 8, each virtual hand includes five virtual player cards.

Server 801 manages the association between the virtual card hands of the client devices and the performance of players in one or more sporting events. Each virtual card game is associated with a period of time during which certain specific sporting events are scheduled to take place. For example, one virtual card game may correspond to all the National Basketball Association basketball games that are scheduled to occur on a specific day; another virtual card game may correspond to all of the college football games that are scheduled to occur in a specific week. Virtual card games may be associated with any type or types of sport, including for example, without limitation, basketball, football, baseball, softball, soccer, hockey, golf, tennis, cricket, rugby, and auto racing. Sporting events may be amateur, professional, or both. The time period associated with a virtual card game may have any duration, including for example, without limitation, a day, an evening, a weekend, a week, a tournament over any number of days or hours, or an entire season. The time period may be in the future or the past, or it may be a period that includes the current time.

In the example shown in FIG. 8, the virtual card game is associated with sporting events such as basketball games 811, 812, and 813. A virtual card game may be associated with any number of sporting events of any sport or sports, over any time period or time periods. Database 802 may contain information about the sporting events, including the events scheduled, the date and time of each event, and the players scheduled to participate in each event. For some sports the events may be competitions between or among teams, and database 802 may indicate which teams participate in each event, and the players on each team that are expected to participate. Server 801 accesses database 802 and uses the information on the events and players to generate a virtual card "shoe" with virtual player cards for all the players expected to participate in events that are scheduled during the time period of the virtual card game. Virtual hands such as virtual hands 831, 832, and 833 may be dealt from this virtual card shoe. In some embodiments of the virtual card game, some or all of the virtual cards may correspond to groups of players, such as entire teams.

As the sporting events 811, 812, 813 progress, information about the performance of the players (and teams) in the events is fed to database 802. In some embodiments, some or all of this information may be updated in almost real time immediately after a player takes an action that affects their performance. Player performance may be measured in any desired manner. For example, statistics that are generally associated with the sport being played may be captured on each player and stored in database 802. Illustrative statistics may include for example, without limitation, points scored and rebounds in basketball, yards gained and passes competed in football, goals and assists in soccer, and runs, hits, and errors in baseball. Server 801 may calculate a value for each virtual player card based on the player performance data in database 802. The virtual hand value for each participant may then be calculated based on the value of each of the virtual cards in the hand. Virtual card game participants may compete with one another for outcomes that depend on the relative value of their hands; for example, in an illustrative virtual card game the winners may be either or both of the hand or hands with the highest values or the hand or hands with the lowest values.

The virtual card game system illustrated in FIG. 8 provides a novel approach that allows sports fans to have a stake in the results of sporting events that is not limited to simple wins and losses of teams or points spreads. Because virtual cards are linked to players that may be selected from multiple teams, the virtual card game system also gives participants an incentive to follow multiple sporting events throughout the game period. Since virtual card values are based on player statistics, which may change at any time during a sporting event, the virtual card game system also encourages participants to follow the progress of each event as each event occurs. The system therefore provides entertainment for the participants, and it also benefits the sporting organizations by encouraging continuous and repeated following of a large number of events. The virtual card games provided by the system are also considerably simpler than fantasy sports leagues, since participants need only join the game and receive their dealt hands; this simplicity encourages broader and more frequent participation.

Figure 9:
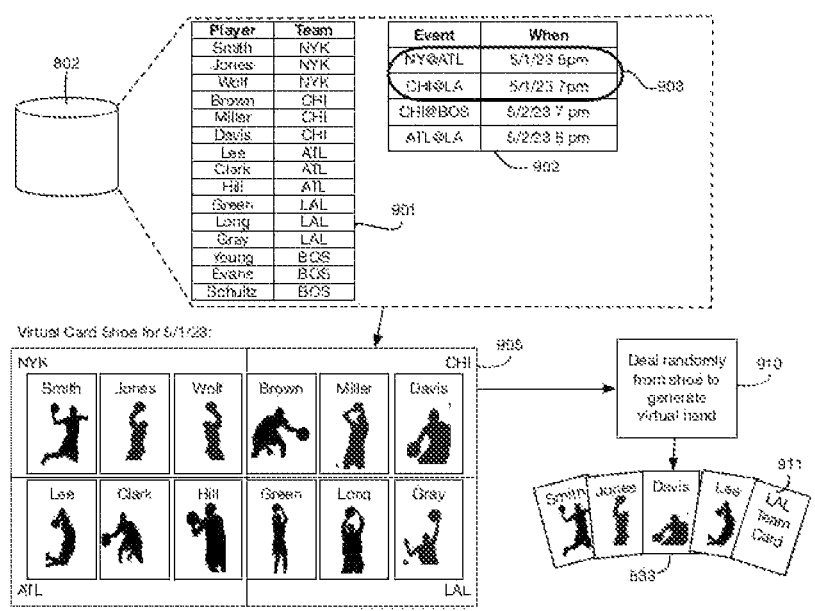
FIG. 9 shows an example of generating a virtual card shoe of virtual player cards for the virtual card game of FIG. 8.

FIG. 9 illustrates the dealing of virtual hands for the virtual card game of FIG. 8. In this illustrative example, database 802 contains a table 901 of players and their associated teams, and a table 902 with the schedule of sporting events. For ease of illustration the tables 901 and 902 are very small; in applications, some embodiments may access hundreds or thousands of players and events. Table 901 contains 15 players organized into 5 teams. (For illustration, only 3 players are shown for each team, although in applications teams may have many more players each.) Table 902 shows events scheduled for two different days; for simplicity only 2 events are shown for each day. In this example, the virtual card game covers the first day of table 902, so the events 903 of that day are used to generate the game. A virtual card shoe 905 is generated for the game; it contains virtual player cards for all the players scheduled to participate in the sporting events 903. This virtual card shoe 905 contains only 12 of the 15 players in table 901, since one of the 5 teams is not scheduled to play during the time period corresponding to the virtual card game. In one or more embodiments of the system, other factors may be used to build the virtual card shoe 905; for example, if it is known that certain players will not play due to injuries, these players may be excluded from the shoe. Or, for example, if a player corresponding to a virtual player card is not on the active roster for a game or event, then the virtual player card for that player may be automatically replaced with a replacement virtual player card from the virtual card shoe 905.

Virtual card shoe 905 contains virtual player cards corresponding to the players that are scheduled to participate in the relevant sporting events for the virtual card game. The virtual "cards" may take any form and may be displayed in any manner; they need not resemble a physical card, for example. In one or more embodiments of the system, the virtual cards may not even be called "cards"; they may be given any name or label and any appearance. For example, virtual cards may be called "entries", "stakes", "tokens", or any other term. When virtual player cards are displayed on a client application, they may show any information that is associated with the player or players linked to the card. In the example shown in FIG. 9, an image of each player is shown along with their name. One or more embodiments may show any other information such as the player's lifetime statistics, their team affiliation and history, their position, and any other information related to the player. The information displayed about a player may be dynamic, in that a participant may be able for example to click on the virtual player card to bring up more information about the player, including highlight videos, interviews, or detailed statistics.

Server 801 performs a random selection 910 from virtual card shoe 905 to generate a virtual hand such as hand 833. The selection may be performed in any manner, using any degree of or type of randomness. Virtual player cards may be selected with or without replacement from shoe 905. In one or more embodiments, virtual player cards may be selected without replacement from the shoe, but the shoe may contain multiple copies of each virtual player card. In one or more embodiments, selection may be made within subgroups of virtual player cards; for example, in sports with different player positions such as football, a hand may consist of a quarterback card (selected randomly from all quarterback cards), a running back card (selected randomly from all running back cards), a linebacker card (selected randomly from all linebacker cards), and a kicker card (selected randomly from all kicker cards). Virtual hands may be constructed from the virtual card shoe using any algorithm and method.

In one or more embodiments of the virtual card game, one or more virtual cards in a virtual hand may correspond to more than one player. For example, in virtual hand 833, card 911 corresponds to an entire team of players. The virtual card game for this embodiment may for example deal 4 individual player cards and 1 team card to each participant. Multi-player cards may not necessarily correspond to entire teams; for example, a multi-player card in football might correspond to an entire defensive squad of one team, or to five linemen selected randomly from all teams. Multi-player virtual cards may be selected in any manner from the virtual card shoe 905.

In one or more embodiments of the virtual card game, the time period for the game may be in the past. This feature may allow participants to play a game where card values depend on the historical performance of players in sporting events that have already taken place, for example during a previous season or a previous tournament.

Figure 10:
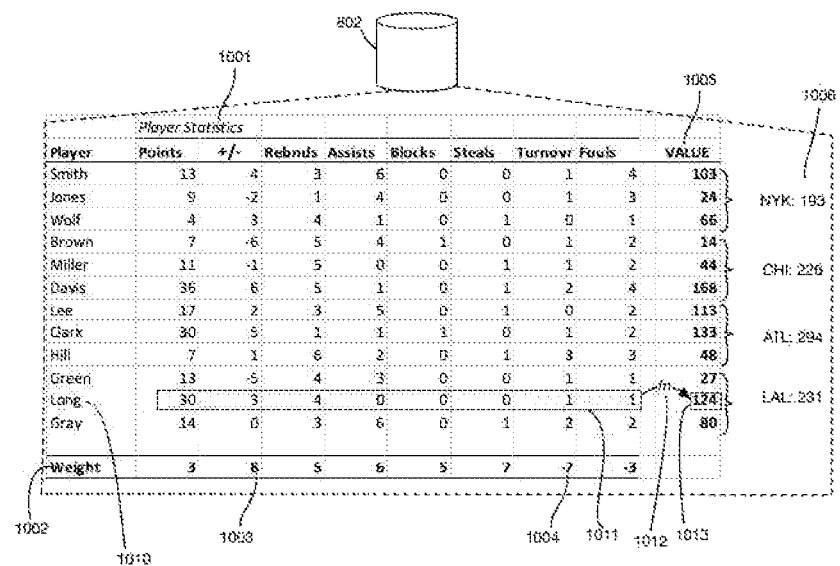
FIG. 10 shows an illustrative calculation of virtual player card values from player statistics for the virtual card game of FIG. 8.

FIG. 10 illustrates calculation of the value of each virtual player card from the performance of each player in the sporting events covered by the virtual card game. Database 802 may include a table 1001 with performance statistics for each player for the events that occur during the virtual card game time period. Table 1001 reflects final player statistics after all events are completed. In this example, the statistics are performance measures commonly tracked for basketball players. Different sports would use other statistics relevant to the players in those sports. For each player, the system calculates a virtual player card value 1005 as a function of the player's statistics. For example, for player 1010, the virtual player card value 1013 is calculated as a function 1012 of the player's statistics 1011. Function 1012 may be any desired mapping from statistics to value. The function may use all or only a portion of the player statistics. In one or more embodiments, function 1012 may be a linear function of the statistics that calculates the value as a weighted sum of the statistics. The value calculations for table 1001 use illustrative weights 1002. Some of the weights may be negative, for example for statistics that represent performance that contributes negatively to the outcome of the sporting event. For example, weight 1004 is negative because the corresponding statistic (turnovers) is detrimental to winning a game; weight 1003 is positive because the corresponding statistic (+/−, which may be the net points gained by a player's team while the player is playing) is beneficial to winning a game. Any positive, negative, or zero weights may be used for any statistics. Statistic values may be positive, zero, or in some cases negative (such as the +/− statistic, which can be negative if a player's team scores less than its opponent when the player is playing).

For multi-player virtual cards, the value of the virtual card may be calculated for example as the sum of the values for the individual players. FIG. 10 shows team card values 1006 for the player statistics 1001; each team card value is the sum of the player values for the three players associated with the team. In one or more embodiments the system may calculate multi-player card values using any aggregation function or other function applied to the individual player values, such as the sum, average, median, or maximum.

Figure 11:
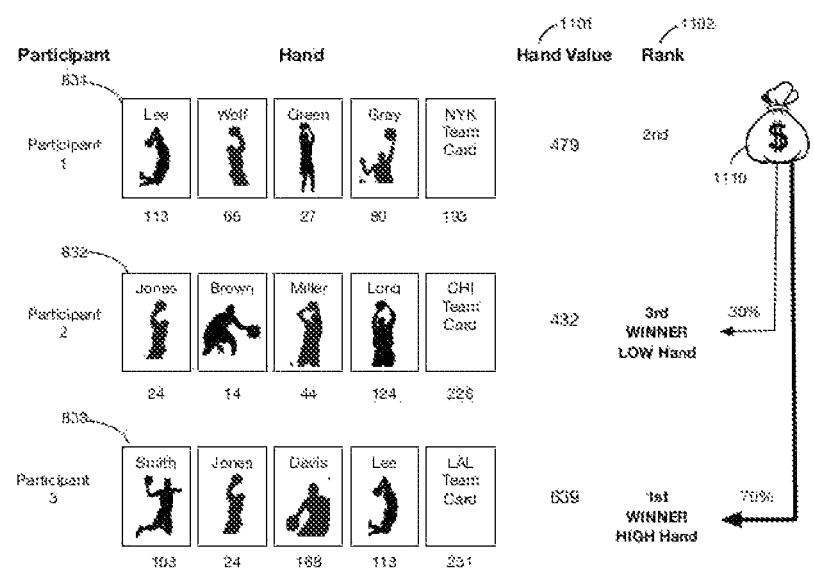
FIG. 11 shows how the virtual hands dealt to the virtual card game participants in FIG. 8 are valued according to the method shown in FIG. 10, and it depicts distribution of a pot based on relative hand values.

FIG. 11 illustrates calculation of virtual hand values 1101 for the virtual hands 831, 832, and 833 based on the player performance data 1001 of FIG. 10. Each virtual player card is assigned a value corresponding to the player value 1005, and each team card is assigned a value according to the team value 1006. The hand value 1101 is the sum of the values of each card in the hand. Each hand has a rank 1102 based on the relative value of each hand. At the end of the game, one or more winners may be declared based on the hand values and ranks. For example, in the virtual card game illustrated in FIG. 11, the game has two winners: the winner with the highest valued hand 833, and the winner with the lowest valued hand 832. Other variations of the virtual card game may for example have winners as some set of the highest valued hands (such as highest, second highest, and third highest), or some set of the lowest valued hands, or both. In some embodiments a pot 1110 may be distributed to one or more of the winners. In some embodiments, the winner may be the lowest ranked hand. The pot may contain any type or types of items such as money, prizes, points, virtual money, bonuses, badges, tickets, collectibles, souvenirs, or credits. In some embodiments game participants may pay into the pot at the beginning of the game or may add to the pot during the game; in other embodiments the pot may be provided entirely by the system or by an external organization. If there are multiple winners, the pot may be divided among the winners in any desired manner as a function of the winners' ranks or hand values; for example, in the game of FIG. 11, the highest hand 833 receives 70% of the pot, and the lowest hand 832 receives 30% of the pot. The game server may transmit the pot distribution amounts to the clients. In some embodiments portions of the pot may be distributed at checkpoints during the game, rather than at the end; for example, the hand with the greatest value halfway through the game may receive a portion of the pot.

Figure 12A:
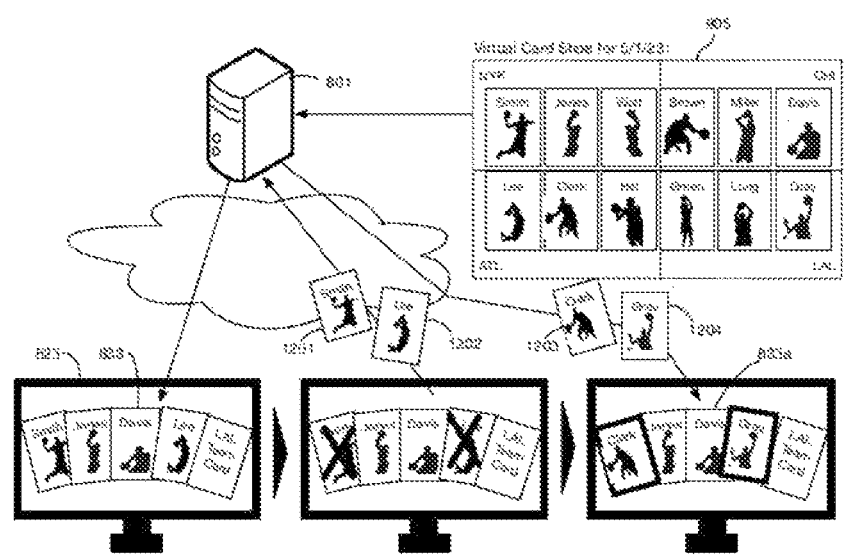
FIG. 12A depicts a variation of the virtual card game of FIG. 8, where participants can discard one or more virtual cards and receive replacement virtual cards.

In one or more embodiments of the system, participants may have the option (or obligation) to discard one or more of the virtual cards initially dealt and receive replacement cards that are dealt from the virtual game shoe. This feature is illustrated in FIG. 12A. Client 823 initially is dealt virtual hand 833. The participant has the option of discarding up to 2 cards in this version of the virtual card game. The participant selects cards 1201 and 1202 to discard; these virtual cards are transmitted to the game server 801, and the server randomly selects two replacement cards 1203 and 1204 from the virtual card shoe 905 and transmits them to client 823. The discarded cards may be inserted back in the virtual card shoe 905 after the replacement cards 1203 and 1204 are dealt to avoid them being redealt to the participant. The participant's final hand 833a will be the hand used to play the virtual card game. One or more embodiments may use variations of this discard feature; for example, a player may have the option of paying into the pot to discard some or all of the virtual cards.

Figure 12B:
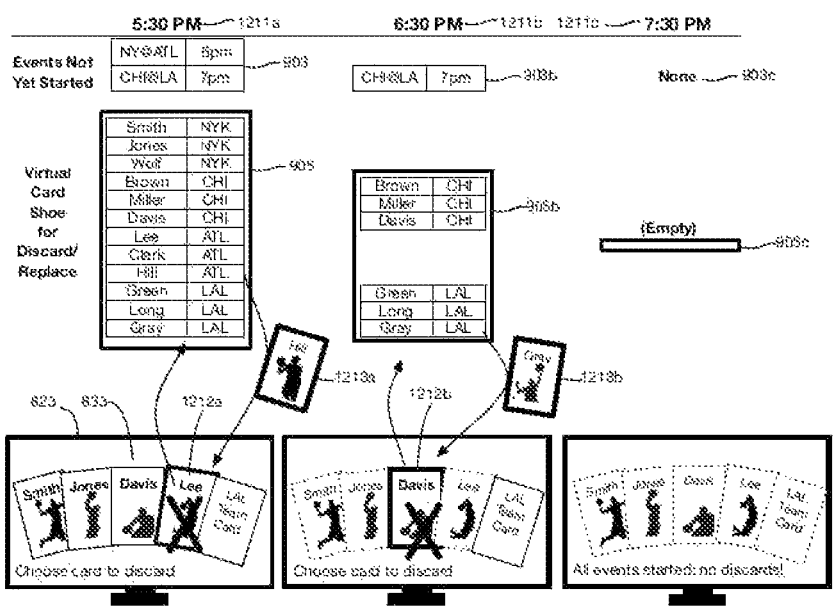
FIG. 12B shows a variation of the discard feature of FIG. 12A, where participants can only discard virtual cards associated with players in sporting events that have not yet begun.

In the example shown in FIG. 12A, participants may discard one or more cards prior to the start of the sporting events associated with the virtual card game. In one or more embodiments of the system, some discards may be allowed even after some of the sporting events have commenced, with the restriction that discards are only allowed for virtual cards associated with players whose associated sporting events have not yet begun. This variation is illustrated in FIG. 12B, which shows the discard options available for hand 833 of client 823 at three different times 1211a, 1211b, and 1211c, for the virtual card game associated with sporting events 903. At time 1211a, none of the sporting events 903 have started; the participant may therefore discard any of the cards in hand 833. The participant discards virtual player card 1212a, and a replacement card 1213a is selected from virtual card shoe 905. Since none of the sporting events have begun, virtual card shoe 905 at time 1211a contains all of the virtual player cards for players in the events 903, and one of these is randomly selected as replacement card 1213a. At time 1211b, one of the sporting events has begun, but event 903b has not yet begun. The participant's discard options are therefore limited to virtual player cards for players in the event 903b that has not yet begun. Only card 1212b is available for discard. If the participant discards this card, then a replacement card 1213b is randomly selected from the updated virtual card shoe 905b; this shoe contains only the virtual player cards for the events 903b that have not yet begun. At time 1211c, all of the sporting events associated with the virtual card game have begun, so no discards are allowed and the virtual card shoe 905c is empty. Limiting discards and replacements to players that are scheduled in sporting events that have not started prevents participants from gaining an unfair advantage by making discard decisions based on players' actual performance after events have begun.

As illustrated in FIG. 11, at the end of the virtual card game, the game server 801 calculates the value of each virtual card and each virtual hand. Each client may display the value of the associated virtual hand, and the hand's rank within the game. In one or more embodiments this information—the value of the virtual hand, its rank within the game, or both—may also be displayed throughout the game, rather than just at the end. This capability allows each participant to follow the evolution of their virtual hand's value as the game progresses. Since hand values are linked to player performance, a participant watching the related sporting events can relate player actions directly and immediately to changes in their hand's value.

Even at the beginning of the virtual card game, when hands have been dealt but before the sporting events have started, the game server 801 may calculate the expected value of the hand based for example on player's historical performances or based on any prediction algorithms that predict each player's performance, such as those disclosed herein. (For example, predictions may be based on each player's previous performances and may also take into account the opponents scheduled for the sporting events covered by the virtual card game.) The expected hand value may also be transmitted to each client and displayed, along with the expected rank in the game.

Figure 13:
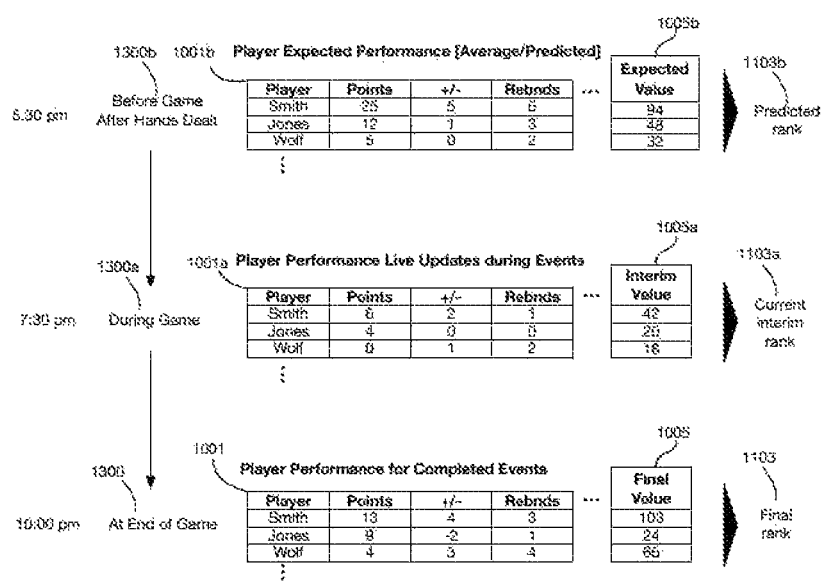
FIG. 13 depicts three different phases of a virtual card game—the beginning when hands are dealt, in progress while sporting events are being played, and at the end after events are completed—and it illustrates how hand values may be calculated at each phase.

These different phases of calculating and displaying hand values and ranks are illustrated in FIG. 13. In phase 1300 at the end of the virtual card game, when all of the relevant sporting events are complete, the actual player statistics 1001 are used to calculate final virtual player card values 1005, and these virtual card values are used to determine the final rank 1103 of each hand. In phase 1300a during the game, while the sporting events are being played, live updates of player performance may be used to update interim player statistics 1001a, which may be used to calculate interim values 1005a for each virtual player card, and to calculate the current (interim) rank 1103a of each virtual hand. In phase 1300b at the beginning of the game, after hands are dealt (and possibly updated by discarding and replacing cards) but before the sporting events begin, historical player performance may be used to calculated expected player statistics 1001b, which may be used to calculate expected values 1005b for each virtual player card, and to calculate the predicted rank 1103b of each virtual hand.

Figure 14:
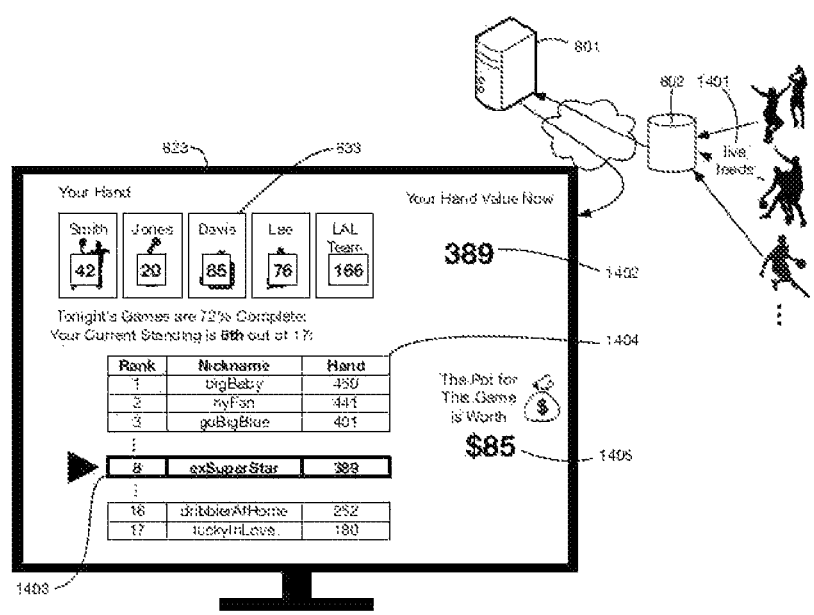
FIG. 14 depicts an illustrative display of the interim value of a virtual hand based on live feeds of player performances during sporting events.

FIG. 14 illustrates the calculation and display of interim player card values and virtual hand rank for virtual hand 833 shown on client 823. Live feeds 1401 of player performance from in-progress sporting events are transmitted to database 802. This data is used by game server 801 to calculate interim virtual player card values for each virtual player card. The game server 801 calculates the interim value of virtual hand 833, and its current rank relative to other participant's virtual hands and transmits this data to client 823 for display. Client 823 may for example show the current value 1402 of the participant's virtual hand 833 (along with the interim value of each card), and it may show a leaderboard 1404 with the current rank and hand value for some or all of the participants in the virtual card game, including the current rank 1403 of the participant's hand 833. It may also show the amount 1405 of the pot for the virtual card game.

Figure 15:
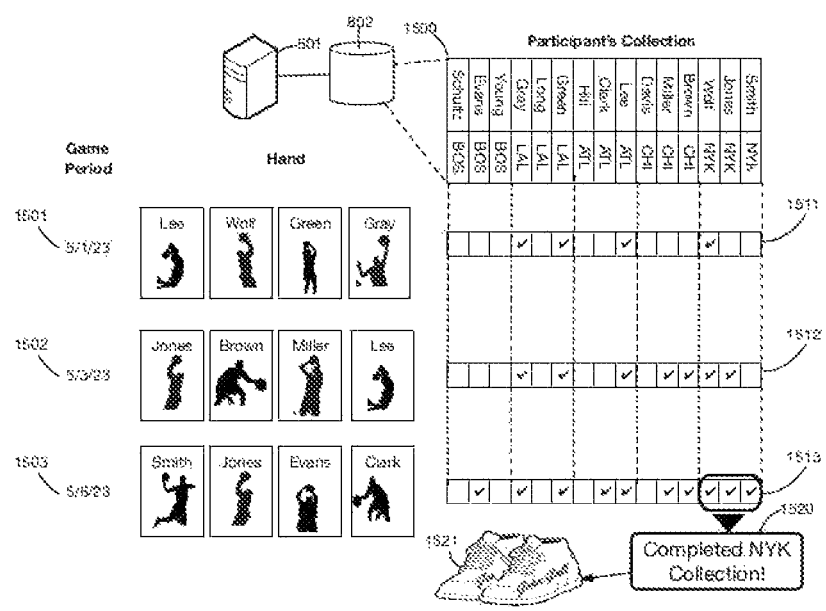
FIG. 15 depicts a variation of the virtual card game of FIG. 8, where participants can earn prizes for collecting all the virtual player cards in a collection.

In one or more embodiments of the virtual card game system, the system may track the virtual player cards that have been dealt to a participant over multiple iterations of the virtual card game. The system may define one or more collections of virtual player cards, such as all of the virtual player cards corresponding to an entire team or league and may award a prize to a participant when they complete one of these collections. This feature is illustrated in FIG. 15. Database 802 contains data on all of the players (such as table 901 of FIG. 9), and it defines certain collections of players that game participants may attempt to collect. In the embodiment shown in FIG. 15, each team corresponds to a player collection. Embodiments of the virtual card game system may define any virtual player card collections, including but not limited to team collections. For example, a collection may be defined as all virtual player cards associated with players with a certain position (such as a collection of all quarterback virtual cards in football), or all players with certain experience (such as a collection of all rookies). A collection may be defined as all or a predetermined number of virtual player cards for all players in a league or in a conference. Any characteristics may be used to define a virtual player card collection.

Database 802 tracks the virtual player cards that have been dealt to each participant over time, for multiple time periods corresponding to different iterations of the virtual card game. FIG. 15 shows this tracking table 1500 for a specific participant who is dealt virtual hands for three iterations of the card game, occurring on dates 1501, 1502, and 1503. For simplicity the virtual hands are shown as 4 cards on each date; each hand may have any number of virtual player cards. Tracking table 1500 is shown as checkboxes at each game date corresponding to each player; these are cumulative. Checkboxes 1511 show the participant's collection after the first hand at game time 1501. Checkboxes 1512 show the participant's cumulative collection after the second hand at game time 1502; this collection includes the virtual player cards of the first and second hands. Checkboxes 1513 show the participant's cumulative collection after the third hand at game time 1503; this collection includes the virtual player cards of the first, second, and third hands. Collection 1513 includes all of the virtual player cards for one of the teams, so the game server 801 determines that the participant has completed this collection and it transmits a message 1520 to the client. A reward or prize 1521 corresponding to the completed collection may also be transmitted to the participant. The reward 1521 contain any type or types of items such as collectibles, souvenirs, money, prizes, points, virtual money, bonuses, badges, tickets, or credits.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium (including, but not limited to, non-transitory computer readable storage media). A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including object oriented and/or procedural programming languages. Programming languages may include, but are not limited to: Ruby, JavaScript, Java, Python, Ruby, PHP, C, C++,C #, Objective-C, Go, Scala, Swift, Kotlin, OCaml, or the like. The program code may execute entirely on the user's computer, partly on the user's computer, as a standalone software package, partly on the user's computer, and partly on a remote computer or entirely on the remote computer or server. In the latter situation scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions.

These computer program instructions may be provided to a processor of a general purpose computer, special purpose computer, or other programmable data processing apparatus to produce a machine, such that the instructions, which execute via the processor of the computer or other programmable data processing apparatus, create an ability for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

We claim:

1. A virtual card game linked to player performance, comprising:
   a game server coupled to
      an events database comprising events data comprising one or more sporting events scheduled during a game time period; and
      a players database comprising player data comprising a plurality of players scheduled to participate in the one or more sporting events during the game time period; and
   a plurality of game clients each coupled to the game server, wherein each game client is associated with a game participant of a plurality of game participants;
   wherein the game server is configured to
      randomly deal a virtual hand from a virtual card shoe to each game participant, the virtual card shoe comprising a plurality of virtual cards, wherein each of the plurality of virtual cards corresponds to one or more players selected from the plurality of players;

transmit the virtual hand of each game participant to the corresponding game client;

receive player performance data corresponding to each of the plurality of players that is a measure of each player's performance in the one or more sporting events;

calculate a card value for each virtual card based on the player performance data corresponding to the one or more players associated with each virtual card;

calculate a virtual hand value for each game participant based on the card value for the plurality of virtual cards in the virtual hand dealt to each game participant;

determine one or more winners from the plurality of game participants based on the virtual hand value associated with each game participant;

calculate a payout from a pot for each winner of the one or more winners; and transmit the payout associated with each winner to the game client associated with each winner, wherein each game client is further configured to accept one or more discarded virtual cards from the hand of the associated game participant and to transmit the one or more discarded virtual cards to the virtual card shoe, the game server is further configured to deal a replacement virtual card from the virtual card shoe to the hand of each game participant for each discarded virtual card, wherein the replacement virtual card corresponds to one or more players selected from the plurality of players.

2. The virtual card game linked to player performance of claim 1, wherein each game client comprises one or more of a web browser and an app.

3. The virtual card game linked to player performance of claim 1, wherein each virtual card is one of
a player card corresponding to a single player selected from the multiplicity of players; or
a team card corresponding to all players of the multiplicity of players that are on a single team.

4. The virtual card game linked to player performance of claim 1, wherein
the player performance data comprises a plurality of player statistics; and
the card value for each virtual card comprises a function of the plurality of player statistics associated with the one or more players corresponding to each virtual card.

5. The virtual card game linked to player performance of claim 4, wherein the function of the plurality of player statistics is a weighted sum of the plurality of player statistics.

6. The virtual card game linked to player performance of claim 5, wherein
the plurality of player statistics associated with a player comprises
one or more positive statistics that represent a positive contribution of the player to the outcome of an event the player participates in; and
one or more negative statistics that represent a negative contribution of the player to the outcome of an event the player participates in; and
the weights in the weighted sum are positive for the one or more positive statistics and negative for the one or more negative statistics.

7. The virtual card game linked to player performance of claim 1, wherein
at one or more times prior to the end of the game time period, the game server is further configured to
receive within-event updates to the player performance data while the one or more sporting events are occurring;
calculate an interim card value for each virtual card based on the within-event updates to the player performance data;
calculate an interim virtual hand value for each game participant based on the sum of the interim card value for the plurality of virtual cards in the virtual hand dealt to each game participant; and
transmit the interim virtual hand value for each game participant to the corresponding game client; and
the game client associated with each game participant is further configured to display the interim virtual hand value.

8. The virtual card game linked to player performance of claim 7, wherein
the game server is further configured to calculate an interim ranking for each game participant based on a distribution of interim virtual hand values and to transmit the interim ranking to the corresponding game client; and
the game client associated with each game participant is further configured to display the interim ranking.

9. The virtual card game linked to player performance of claim 1, wherein
when the game server deals the virtual hand comprising a plurality of virtual cards to each game participant, the game server is further configured to
calculate an expected card value for each virtual card from historical player performance data;
calculate an expected virtual hand value for each game participant based on the sum of the expected virtual card value for the plurality of virtual cards in the virtual hand dealt to each game participant; and
transmit the expected virtual hand value for each game participant to the corresponding game client; and
the game client associated with each game participant is further configured to display the expected virtual hand value.

10. The virtual card game linked to player performance of claim 9, wherein
the game server is further configured to calculate an expected ranking for each game participant based on a distribution of the expected virtual hand values and to transmit the expected ranking to the corresponding game client; and
the game client associated with each game participant is further configured to display the expected ranking.

11. The virtual card game linked to player performance of claim 1, wherein
the game server is further coupled to one or more collectible sets, wherein each of the collectible sets comprise one or more virtual cards; and
the game server is further configured to
add the plurality of virtual cards in the hand of each game participant to a virtual card collection associated with each game participant; and
when a virtual card collection associated with a game participant contains all of the virtual cards in a collectible set of the one or more collectible sets, transmit to the game participant a reward corresponding to the collectible set.

12. The virtual card game linked to player performance of claim 11, wherein at least one of the one or more collective sets comprises at least one of:

all of the virtual cards associated with all of the players on a team; and all of the virtual cards associated with all of the players in a league.

13. The virtual card game linked to player performance of claim 11, wherein at least one of the one or more collective sets comprises at least one of:
    a predetermined number of all of the virtual cards associated with all of the players on a team; and
    a predetermined number of all of the virtual cards associated with all of the players in a league.

14. The virtual card game linked to player performance of claim 1, wherein the virtual card shoe is updated in real time during the game time period such that the virtual player cards corresponding to a sporting event are removed from the virtual card shoe when the sporting event has started.

15. The virtual card game linked to player performance of claim 1, wherein
    each game client is configured to accept a pay-in amount from the associated game participant and to transmit the pay-in amount to the game server; and
    the game server is configured to calculate the payout based on the total pay-in received from the plurality of game clients.

16. A virtual card game linked to player performance, comprising:
    a game server coupled to
        an events database comprising events data comprising one or more sporting events scheduled during a game time period; and
        a players database comprising player data comprising a plurality of players scheduled to participate in the one or more sporting events during the game time period; and
    a plurality of game clients each coupled to the game server, wherein each game client is associated with a game participant of a plurality of game participants;
    wherein the game server is configured to
        randomly deal a virtual hand from a virtual card shoe to each game participant, the virtual card shoe comprising a plurality of virtual cards, wherein each of the plurality of virtual cards corresponds to one or more players selected from the plurality of players;
        transmit the virtual hand of each game participant to the corresponding game client;
        receive player performance data corresponding to each of the plurality of players that is a measure of each player's performance in the one or more sporting events;
        calculate a card value for each virtual card based on the player performance data corresponding to the one or more players associated with each virtual card;
        calculate a virtual hand value for each game participant based on the card value for the plurality of virtual cards in the virtual hand dealt to each game participant;
        determine one or more winners from the plurality of game participants based on the virtual hand value associated with each game participant;
        calculate a payout from a pot for each winner of the one or more winners; and
    transmit the payout associated with each winner to the game client associated with each winner, wherein
        when the game server deals the virtual hand comprising a plurality of virtual cards to each game participant, the game server is further configured to
            calculate an expected card value for each virtual card from historical player performance data;
            calculate an expected virtual hand value for each game participant based on the sum of the expected virtual card value for the plurality of virtual cards in the virtual hand dealt to each game participant; and
            transmit the expected virtual hand value for each game participant to the corresponding game client; and
        the game client associated with each game participant is further configured to display the expected virtual hand value.

17. The virtual card game linked to player performance of claim 16, wherein
    the game server is further configured to calculate an expected ranking for each game participant based on a distribution of the expected virtual hand values and to transmit the expected ranking to the corresponding game client; and
    the game client associated with each game participant is further configured to display the expected ranking.

18. A virtual card game linked to player performance, comprising:
    a game server coupled to
        an events database comprising events data comprising one or more sporting events scheduled during a game time period; and
        a players database comprising player data comprising a plurality of players scheduled to participate in the one or more sporting events during the game time period; and
    a plurality of game clients each coupled to the game server, wherein each game client is associated with a game participant of a plurality of game participants;
    wherein the game server is configured to
        randomly deal a virtual hand from a virtual card shoe to each game participant, the virtual card shoe comprising a plurality of virtual cards, wherein each of the plurality of virtual cards corresponds to one or more players selected from the plurality of players;
        transmit the virtual hand of each game participant to the corresponding game client;
        receive player performance data corresponding to each of the plurality of players that is a measure of each player's performance in the one or more sporting events;
        calculate a card value for each virtual card based on the player performance data corresponding to the one or more players associated with each virtual card;
        calculate a virtual hand value for each game participant based on the card value for the plurality of virtual cards in the virtual hand dealt to each game participant;
        determine one or more winners from the plurality of game participants based on the virtual hand value associated with each game participant;
        calculate a payout from a pot for each winner of the one or more winners; and
    transmit the payout associated with each winner to the game client associated with each winner,
    wherein
        the game server is further coupled to one or more collectible sets, wherein each of the collectible sets comprise one or more virtual cards; and
        the game server is further configured to
            add the plurality of virtual cards in the hand of each game participant to a virtual card collection associated with each game participant; and when a virtual card collection associated with a game participant contains all of the virtual cards in a collectible set of the one or more collectible sets, transmit to the game participant a reward corresponding to the collectible set.

19. The virtual card game linked to player performance of claim 18, wherein at least one of the one or more collective sets comprises at least one of:
   all of the virtual cards associated with all of the players on a team; and
   all of the virtual cards associated with all of the players in a league.

20. The virtual card game linked to player performance of claim 18, wherein at least one of the one or more collective sets comprises at least one of:
   a predetermined number of all of the virtual cards associated with all of the players on a team; and
   a predetermined number of all of the virtual cards associated with all of the players in a league.

* * * * *